US 6,681,011 B1

(12) United States Patent
Staver et al.

(10) Patent No.: US 6,681,011 B1
(45) Date of Patent: Jan. 20, 2004

(54) METHOD AND MODEM CIRCUIT USING A DITHER SIGNAL FOR DETERMINING CONNECTION STATUS OF A PHONE LINE

(75) Inventors: Daniel A. Staver, Scotia, NY (US); Glen W. Brooksby, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/546,849

(22) Filed: Apr. 11, 2000

(51) Int. Cl.[7] ............................................... H04M 1/00
(52) U.S. Cl. ................ 379/387.01; 379/377; 379/93.09
(58) Field of Search ..................... 379/93.09, 93.05, 379/387.01, 377, 399.01, 382, 164, 165, 207.05, 207.06, 207.07

(56) References Cited

U.S. PATENT DOCUMENTS

| | | |
|---|---|---|
| 4,392,023 A | 7/1983 | Sears |
| 4,500,754 A | 2/1985 | Mackey |
| 4,811,389 A * | 3/1989 | Balch .......................... 379/377 |
| 4,815,124 A * | 3/1989 | Bowers et al. ............... 379/237 |
| 4,958,371 A | 9/1990 | Damoci et al. |
| 5,140,631 A | 8/1992 | Stahl |
| 5,485,509 A * | 1/1996 | Oliver ......................... 379/106 |
| 5,506,891 A | 4/1996 | Brown et al. |
| 5,790,653 A * | 8/1998 | Fairbanks, Sr. et al. .... 379/372 |
| 6,292,546 B1 * | 9/2001 | Gayrard ................... 379/93.09 |

* cited by examiner

Primary Examiner—Rexford Barnie
(74) Attorney, Agent, or Firm—Jean K. Testa; Enrique J. Mora; Beusse Brownlee Wolter Mora & Maire, P.A.

(57) ABSTRACT

A circuit and method for determining connection status of a phone line shared by multiple telecommunications devices, such as modems and phones, are provided. The phone line includes respective tip and ring lines. The circuit comprises a first operational amplifier coupled to receive a signal indicative of a voltage difference between the respective tip and ring lines. The circuit further comprises a lag network coupled to impart a predetermined delay to the output signal from the first operational amplifier. A second operational amplifier is coupled to receive the voltage difference signal. The output signal from the second operational amplifier has a sufficiently fast time response relative to the output signal from the lag network.

18 Claims, 2 Drawing Sheets

METHOD AND MODEM CIRCUIT USING A DITHER SIGNAL FOR DETERMINING CONNECTION STATUS OF A PHONE LINE

This application is related to U.S. Pat. No. 6,393,123 B1, entitled "Method And Modem Circuit For Determining Connection Status Of A Phone Line", by Daniel A. Staver et al., filed concurrently herewith and assigned to the assignee of the present invention and herein incorporated by reference.

BACKGROUND OF THE INVENTION

This invention is generally related to the field of telecommunications devices, such as telephones, facsimile machines, computer modems, automatic alarm or diagnostic dialers, etc., which operate over telephone lines. More particularly, this invention is related to a circuit and method that may be used in such devices for determining the connection status of a telephone line shared by the device, e.g., determining whether the telephone line is On-Hook or Off-Hook.

It is typical that a residential or business user may want to connect more than one telecommunication device in one common telephone line. When one of the devices has an auto-dialing function, such as in a facsimile machine or a modem, conflicts may arise if the telephone line is in use (Off-Hook) when the automatic device attempts to dial a number. The presence of the automatic devices should not impact on normal usage of the telephone line for voice communications. Therefore, the devices should have some means of determining when the telephone line is being used for normal voice communication on one of the local telephones. Further, the devices should not attempt to use the telephone line if it can be determined that the line is in use, and such determination should be made without interfering with existing communications. Similarly, when the automatic device is using the telephone line, it should abandon the line if one of the local telephones goes Off-Hook. Further, the automatic device should not prevent normal usage of the telephone line in an emergency situation. For the various reasons given above, the devices should have circuitry for detecting whether the telephone line is Off-Hook or On-Hook during various operational modes such as before dialing is attempted, or for determining whether a present communication should be temporarily discontinued.

As will be appreciated by those skilled in the art, when a telephone line is in On-Hook condition, i.e., when the telephone handset is resting on its cradle, there is virtually no current flow, and the line voltage is relatively high, typically 50 V DC. Conversely, when a telephone line is in Off-Hook condition, the phone circuits complete a circuit loop and there may be current consumption of, for example, 10–50 mA DC, and the line voltage is low, about 1–10 V DC. The line state may thus be detected either by sensing the current in the line, or by sensing the line voltage.

Generally such telecommunication devices include a line interface between the telephone line and their data circuits and that line interface is chosen to provide a suitable impedance match between the telephone line and the data circuits in the device. Further, such line interface is required to galvanically isolate the data circuits from the telephone line. The galvanic isolation is typically achieved by the use of transformers, opto-couplers, relays, or by a combination of such components. Thus, the data circuits may be electrically isolated from the telephone line while the signal information is electromagnetically or optically coupled therebetween depending, for example, on whether a transformer or an opto-coupler is respectively used to provide the galvanic isolation.

Although determining whether a respective device is loading the telephone line is conceptually relatively straight forward, such as could be made by tracking DC voltage measurements between respective ring and tip lines of the telephone line. Unfortunately, in practice such determination is not so simple. One problem is that the characteristics of the telephone line itself can greatly change, both from site to site and at a single site over a period of time. Further, as suggested above, when the device is using the telephone line it should be able to detect when one of the local telephones goes off hook. In this case, making an accurate determination becomes problematic since there may be great variation in the line loading created by different types of telephones. Some prior art line connection detectors, have used opto-coupler devices for sensing line current variation. Unfortunately, such detectors are prone to errors since they are limited to operate in a relatively narrow range where they exhibit linear characteristics. Other prior art devices have required use of analog-to-digital converters which add to the cost and complexity of the detector.

From the foregoing it will be appreciated that it is desirable to provide a circuit and method that may be used by the telecommunication devices for determining the connection status of the telephone line that has the following characteristics: maintains substantial isolation from the line, responds promptly and accurately even in the presence of noise and conversely does not generate noise which can interfere with data/and or voice transmission, requires no interaction between local and remote locations to function, is impervious to the non-ideal characteristics of real circuit components, such as the presence of offset voltages, bias currents, etc., is inexpensive and reliable.

BRIEF SUMMARY OF THE INVENTION

Generally speaking, the present invention fulfills the forgoing needs by providing a circuit for determining connection status of a phone line including respective tip and ring lines. The circuit comprises a first operational amplifier coupled to receive a signal indicative of a voltage difference between the respective tip and ring lines. The circuit further comprises a lag network coupled to impart a predetermined delay to the output signal from the first operational amplifier. A second operational amplifier is coupled to receive the voltage difference signal. The output signal from the second operational amplifier has a sufficiently fast time response relative to the output signal from the lag network.

The present invention further fulfills the forgoing needs by providing a telecommunications device, such as a modem, having a circuit for determining connection status of a phone line shared by that device with a phone. The phone line includes respective tip and ring lines. The device comprises a controller coupled to receive from the circuit a signal indicative of the connection status of the phone line and having means for initiating or interrupting a respective communication based on the indicated line connection status, and wherein the circuit in turn comprises a first operational amplifier coupled to receive a signal indicative of a voltage difference between the respective tip and ring lines. The circuit further comprises a lag network coupled to impart a predetermined delay to the output signal from the first operational amplifier. A second operational amplifier is coupled to receive the voltage difference signal, the output signal from the second operational amplifier having a sufficiently fast time response relative to the output signal from the lag network.

In another aspect of the invention, the foregoing needs are further fulfilled by providing a method for determining connection status of a phone line including respective tip and ring lines. The method allows for receiving in two circuit paths a signal indicative of a voltage difference between the respective tip and ring lines. The method further allows for imparting in one of the paths a predetermined lag to the signal propagating therethrough so that the signal propagating in the other path has a sufficiently fast time response relative to the signal propagating in the one path with the lag.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
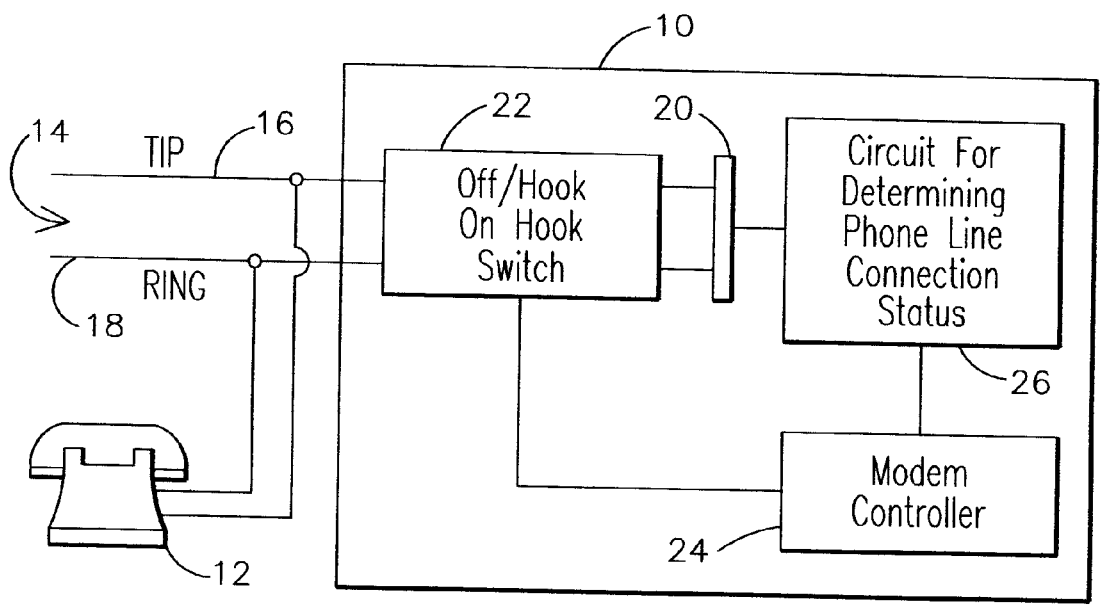
FIG. 1 is a schematic diagram of a tecommunications device, such as a modem, that may benefit from the techniques of the present invention. The modem is shown as sharing a common line with a telephone and uses the circuit of the present invention for determining the connection status of the line.

FIG. 1 shows an exemplary modem 10 that may benefit from the techniques of the present invention. Modem 10 and a telephone 12 are connected to a common telephone line 14, made up of respective tip and ring lines 16 and 18. A galvanic isolation device, such as an optocoupler 20, is connected to lines 16 and 18 via contacts in a Off hook/On Hook relay switch 22. For example, telephone line 14 may be connected to the modem circuitry when the switch 22 is in a conductive state, and disconnected from the modem circuitry when the switch 22 is a nonconductive state. A modem controller 24 may include a microprocessor with associated memory for control of the modem, and in particular control of the respective state of switch 22, at least in part due to an output signal from a circuit 26 that embodies the techniques of the present invention for determining the connection status of the telephone line, i.e., tip and ring lines 16 and 18.

By way of example, when the modem 10 is activated for dialing, the modem controller 24 may initially check if telephone line 14 is available, by polling circuit 26 for determining phone line connection status. If line 14 is in On-Hook condition, modem controller 24 energizes switch 22 into its conductive state, and automatic dialing starts. Conversely, if the telephone line 14 is in use, modem 10 waits for the line to become available before energizing switch 22 into a conducting state and start dialing. Conversely, if the modem has established communication and circuit 26 determines that telephone 12 is Off-Hook, then modem controller 24 could temporarily suspend communications and command switch 22 into a non-conducting state and thus free line 14 to the telephone user.

Figure 2:
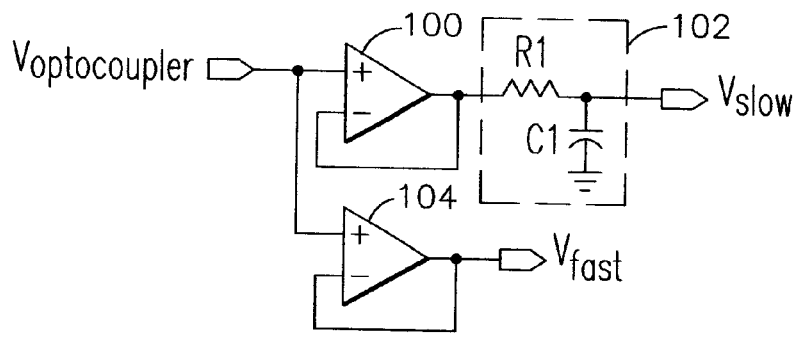
FIG. 2 illustrates further details regarding the circuit of the present invention for generating respective output signals indicative of a voltage difference across the tip and ring lines and having a different time response relative to one another.

FIG. 2 shows further details in connection with circuit 26 for determining connection status of a phone line including respective tip and ring lines 18 and 20. As shown in FIG. 2, circuit 26 is made up of a first operational amplifier 100 coupled to receive a signal indicative of a voltage difference between the respective tip and ring lines 16 and 18. In this case, the input signal supplied to operational amplifier 100 is supplied by optocoupler 20 (FIG. 1). A lag network 102 is coupled to impart a predetermined delay to the output signal from operational amplifier 100. A second operational amplifier 104 is also coupled to receive the voltage difference signal from optocoupler 20. The output signal from operational amplifier 104 has a sufficiently fast time response relative to the output signal from lag network 102. As shown in FIG. 2, lag network 102 comprises, a resistor/capacitor (RC) network and, as will be appreciated by those skilled in the art, the response time of the output signal (Vslow) is determined by the time constant of the RC network. Exemplary values of the RC time constant may be from about 10 to about 100 ms. Thus, the time response of the output signal (Vfast) from operational amplifier 104 will be relatively fast compared to the time response of the output signal from the lag network. It will be appreciated by those skilled in the art, that operational amplifiers 100 and 104 are respectively connected as respective voltage followers. For readers interested in background information regarding the principles of operation of operational amplifiers reference is made to textbook titled "Operational Amplifiers" by Arpad Barna, published by Wiley-Interscience, a division of John Wiley & Sons, Inc., which textbook is incorporated herein by reference.

Figure 3:
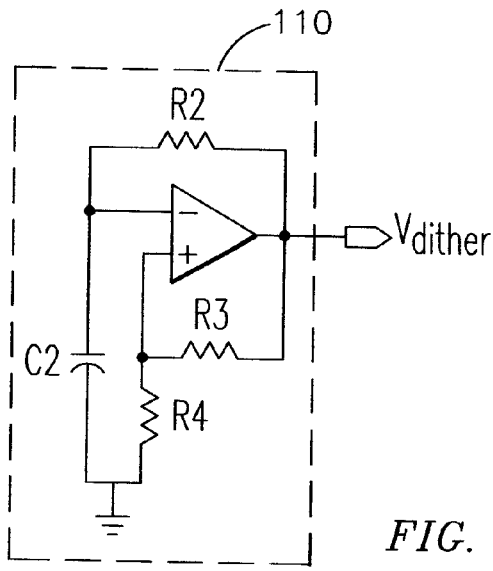
FIG. 3 illustrates one exemplary embodiment of an oscillator used in the circuit of the present invention.

FIG. 3 shows further details in connection with circuit 26 for determining phone line connection status. As shown in FIG. 3, circuit 26 further comprises an oscillator 110 for supplying a dither signal having a predetermined frequency that is sufficiently fast relative to the RC time constant of lag network 102 (FIG. 2), so that there is little voltage discharge over any respective cycle of the dither signal. The frequency of the dither signal is established by the relative values of feedback resistor R2, voltage-divider resistors R3 and R4, and feedback capacitor C2 through relationships well known to those skilled in the art. It will be appreciated that the implementation of oscillator 110 that uses an operational amplifier shown in FIG. 3, is merely exemplary since there are many other types of oscillator circuits, e.g., off-the-shelf integrated circuit chips, that may accomplish the same operation.

Figure 4:
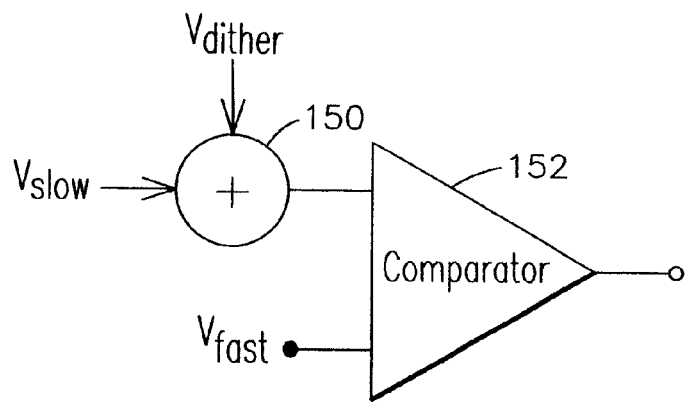
FIG. 4 illustrates one embodiment for processing the output signal from the oscillator of FIG. 3 and the respective output signal from the circuit of FIG. 2.

FIG. 4 shows further details in connection with circuit 26 that illustrate one exemplary embodiment for processing the dither signal (FIG. 3) and the respective output signals Vfast and Vslow (FIG. 2). As shown in FIG. 4, circuit 26 further comprises a summer 150 coupled to receive the dither signal from oscillator 110 and the output signal from the lag network to supply a combined output signal. The combined output signal from summer 150 is supplied to a comparator 152 for comparing the combined output signal from the summer against the output signal (Vfast) from operational amplifier 104 to supply a signal indicative of the connection status of the phone line.

Figure 5:
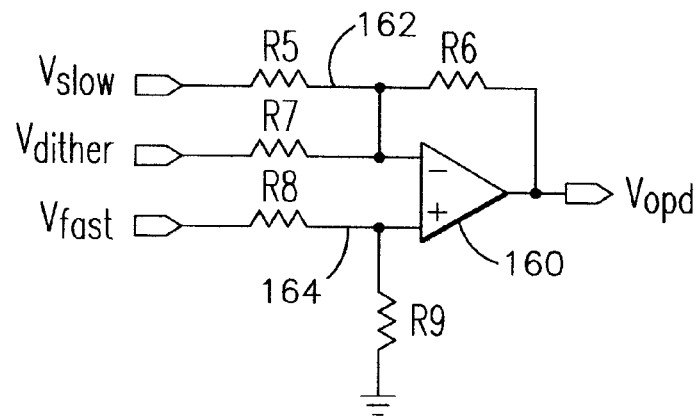
FIG. 5 illustrates another embodiment for processing the output signal from the oscillator of FIG. 3 and the respective output signal from the circuit of FIG. 2.

FIG. 5 shows another exemplary embodiment for processing the dither signal (FIG. 3) and the respective output signals Vfast and Vslow (FIG. 2). As shown in FIG. 5, a differential amplifier 160, that has an inverting terminal 162 and a non-inverting terminal 164, is coupled to receive the dither signal and the respective Vfast and Vslow output signals. The inverting terminal 162 is coupled to receive both the dither signal and the output signal (Vslow) from the lag network 102. The non-inverting terminal 164 is coupled to receive the output signal (Vfast) from operational amplifier 104. The differential amplifier 160 has an output terminal for supplying a signal indicative of the connection status of the phone line extension.

Figure 6A:
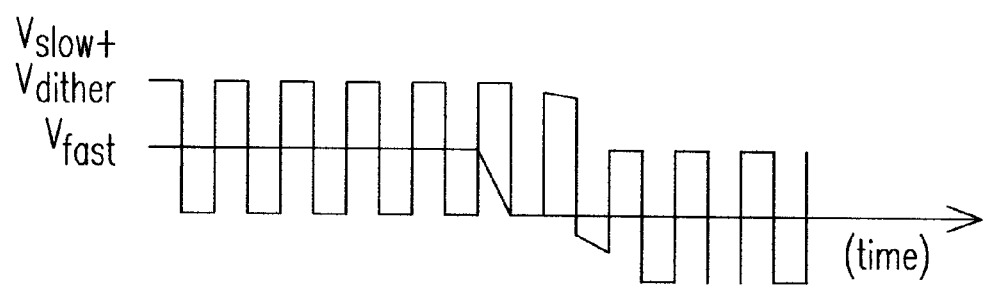
FIG. 6 illustrates respective exemplary waveforms from the circuits of FIGS. 2, 3 and 5 that may be used for determining the connection status of the phone line.
Figure 6B:
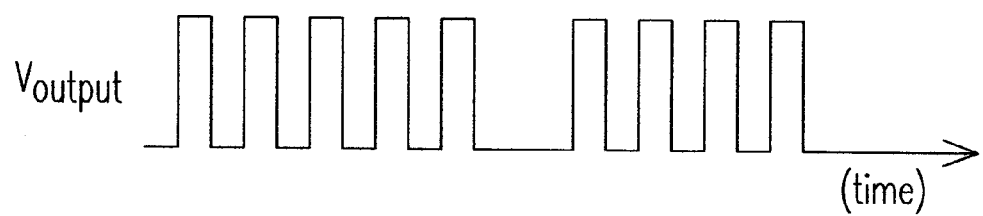

FIG. 6 shows exemplary signal waveforms that represent in FIG. 6a the combination of Vslow and the dither signal, such as may be obtained from summer 150. (FIG. 4), and further shows, superimposed on the foregoing combination signal, the V fast signal, such as may be obtained from operational amplifier 104 (FIG 2). FIG. 6b represents an exemplary waveform of a signal indicative of an off-hook condition, such may be obtained from the output of comparator 152 (FIG. 4) or the output of differential amplifier 160 (FIG. 5).

In another aspect of the present invention, a method is provided for determining connection status of a phone line including respective tip and ring lines. The method allows for propagating in two separate circuit paths, such as the paths provided by voltage followers 100 and 104 (FIG. 2), a signal indicative of a voltage difference between the respective tip and ring lines. The method further allows for imparting in one of the paths a predetermined lag, such as may be imparted by lag network 102), to the signal propagating in that one path so that the signal propagating in the other path has a sufficiently fast time response relative to the signal propagating in the one path with the lag. The method further allows for generating a dither signal, such as may be generated by oscillator 110 (FIG. 3) having a predetermined frequency. As suggested above, the predetermined frequency of the dither signal is chosen to be sufficiently fast relative to the predetermined lag. The method further allows for additively combining in a summer 150 (FIG. 4) the dither signal and the signal having a relatively slow time response to supply a combined output signal. The method further comprises a step for comparing in a comparator 152 (FIG. 4) the combined output signal against the signal having a relatively fast time response to supply a signal indicative of the connection status of the phone line extension. Alternatively, the method allows for differentially amplifying through respective inverting and non-inverting terminals of a differential amplifier 160 (FIG. 5) the dither signal and the respective output signals Vfast and Vslow. The inverting terminal is coupled to receive the dither signal and the signal having a relatively slow time response, and the non-inverting terminal is coupled to receive the signal having a relatively fast time response to supply a signal indicative of the connection status of the phone line. The respective output signal from either comparator 152 or differential amplifier 160 may be supplied to modem controller 24 (FIG. 1) to be processed so as take appropriate modem action depending on whether an Off-Hook conditions has been detected. The processing of the output signal indicative of the connection status of the line may be implemented in various ways, such as polling that signal by controller 24 or by demodulating that signal with the original output signal from oscillator 110 in an exclusive-or circuit, etc. It will be further appreciated that the output signal indicative of the connection status of the line may be appropriately filtered to suppress spikes, etc. As suggested above, that signal may be used by controller 24 as an interrupt signal depending on when the off-hook condition is detected.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope, of the appended claims.

What is claimed is:

1. A circuit for determining connection status of a phone line including respective tip and ring lines, the circuit comprising:
   a first operational amplifier coupled to receive a signal indicative of a voltage difference between the respective tip and ring lines;
   a lag network coupled to impart a predetermined delay to the output signal from the first operational amplifier, the lag network comprising an RC network;
   an oscillator for supplying a dither signal having a predetermined frequency;
   a second operational amplifier coupled to receive the voltage difference signal, the output signal from the second operational amplifier having a sufficiently fast time response relative to the output signal from the lag network; and
   a differential amplifier having an inverting terminal and a non-inverting terminal, the inverting terminal coupled to receive the dither signal and the output signal from the lag network, and the non-inverting terminal coupled to receive the output signal from the second operational amplifier, the differential amplifier further having an output terminal for supplying a signal indicative of the connection status of the phone line.

2. The circuit of claim 1 wherein the first and second operational amplifiers are configured as respective voltage followers.

3. The circuit of claim 1 wherein the predetermined frequency of the dither signal is sufficiently fast relative to the time constant of the RC network.

4. The circuit of claim 1 further comprising a summer coupled to receive the dither signal and the output signal from the lag network to supply a combined output signal.

5. The circuit of claim 4 further comprising a comparator for comparing the combined output signal from the summer against the output signal from the second operational amplifier to supply a signal indicative of the connection status of the phone line.

6. A telecommunications device having a circuit for determining connection status of a phone line shared by that device with a phone, the phone line including respective tip and ring lines, the device comprising:
   a controller coupled to receive from the circuit a signal indicative of the connection status of the phone line and having means for initiating or interrupting a respective communication based on the indicated line connection status, and wherein the circuit in turn comprises:
   a first operational amplifier coupled to receive a signal indicative of a voltage difference between the respective tip and ring lines;
   a lag network coupled to impart a predetermined delay to the output signal from the first operational amplifier wherein the lag network comprises an RC network; and an oscillator for supplying a dither signal having a predetermined frequency;

a second operational amplifier coupled to receive the voltage difference signal, the output signal from the second operational amplifier having a sufficiently fast time response relative to the output signal from the lag network; and a differential amplifier having an inverting terminal and a non-inverting terminal, the inverting terminal coupled to receive the dither signal and the output signal from the lag network, and the non-inverting terminal coupled to receive the output signal from the second operational amplifier, the differential amplifier further having an output terminal for supplying the signal indicative of the connection status of the phone line.

7. The device of claim 6 comprising a modem.

8. The device of claim 6 wherein the first and second operational amplifiers comprise respective voltage followers.

9. The device of claim 6 wherein the predetermined frequency of the dither signal is sufficiently fast relative to the time constant of the RC network.

10. The device of claim 6 further comprising a summer coupled to receive the dither signal and the output signal from the lag network to supply a combined output signal.

11. The device of claim 10 further comprising a comparator for comparing the combined output signal from the summer against the output signal from the second operational amplifier to supply the signal indicative of the connection status of the phone line.

12. A method for determining connection status of a phone line including respective tip and ring lines the method comprising:

receiving in two circuit paths a signal indicative of a voltage difference between the respective tip and ring lines;

imparting in one of the paths a predetermined lag to the signal propagating therethrough so that the signal propagating in the other path has a sufficiently fast time response relative to the signal propagating in the one path with the lag;

generating a dither signal having a predetermined frequency wherein the predetermined frequency of the dither signal is sufficiently fast relative to the predetermined lag; and differentially amplifying through an inverting terminal and a non-inverting terminal the dither signal and the respective signals having a different time response relative to one another, the inverting terminal coupled to receive the dither signal and the signal having a relatively slow time response, and the non-inverting terminal coupled to receive the signal having a relatively fast time response so as to supply a signal indicative of the connection status of the phone line extension.

13. The method of claim 12 further comprising a step of additively combining the dither signal and the signal having a relatively slow time response to supply a combined output signal.

14. The method of claim 13 further comprising a step for comparing the combined output signal against the signal having a relatively fast time response to supply a signal indicative of the connection status of the phone line extension.

15. A circuit for determining connection status of a phone line including respective tip and ring lines, the circuit comprising:

a first operational amplifier coupled to receive a signal indicative of a voltage difference between the respective tip and ring lines;

a lag network coupled to impart a predetermined delay to the output signal from the first operational amplifier;

an oscillator for supplying a dither signal having a predetermined frequency;

a second operational amplifier coupled to receive the voltage difference signal, the output signal from the second operational amplifier having a sufficiently fast time response relative to the output signal from the lag network; and a differential amplifier having an inverting terminal and a non-inverting terminal, the inverting terminal coupled to receive the dither signal and the output signal from the lag network, and the non-inverting terminal coupled to receive the output signal from the second operational amplifier, the differential amplifier further having an output terminal for supplying a signal indicative of the connection status of the phone line.

16. A circuit for determining connection status of a phone line including respective tip and ring lines, the circuit comprising:

a first operational amplifier coupled to receive a signal indicative of a voltage difference between the respective tip and ring lines;

a lag network coupled to impart a predetermined delay to the output signal from the first operational amplifier;

an oscillator for supplying a dither signal having a predetermined frequency;

a second operational amplifier coupled to receive the voltage difference signal, the output signal from the second operational amplifier having a sufficiently fast time response relative to the output signal from the lag network; and a signal processing circuit coupled to combine the dither signal and the output signal from the lag network and relate a resulting combined signal to the output signal from the second operational amplifier, the signal processing circuit configured to supply a signal indicative of the connection status of the phone line based on the relating results.

17. The circuit of claim 16 wherein the signal processing circuit comprises a differential amplifier.

18. The circuit of claim 16 wherein the signal processing circuit comprises a summer and a comparator.

* * * * *